(12) United States Patent
Ozeki

(10) Patent No.: US 11,614,727 B2
(45) Date of Patent: Mar. 28, 2023

(54) COMMUNICATION CONTROLLER

(71) Applicant: FANUC CORPORATION, Yamanashi (JP)

(72) Inventor: Shinichi Ozeki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 201 days.

(21) Appl. No.: 17/097,139

(22) Filed: Nov. 13, 2020

(65) Prior Publication Data
US 2021/0173374 A1    Jun. 10, 2021

(30) Foreign Application Priority Data

Dec. 6, 2019   (JP) .............................. JP2019-221525

(51) Int. Cl.
*G05B 19/402*    (2006.01)
*G05B 19/406*    (2006.01)

(52) U.S. Cl.
CPC ......... *G05B 19/402* (2013.01); *G05B 19/406* (2013.01); *G05B 2219/34465* (2013.01); *G05B 2219/36272* (2013.01); *G05B 2219/37582* (2013.01); *G05B 2219/50391* (2013.01)

(58) Field of Classification Search
CPC ............... G05B 19/402; G05B 19/406; G05B 2219/34465; G05B 2219/36272; G05B 2219/37582; G05B 2219/50391; G05B 19/18; G05B 2219/31094
See application file for complete search history.

(56) References Cited

U.S. PATENT DOCUMENTS

| | | | | |
|---|---|---|---|---|
| 9,043,031 | B1* | 5/2015 | Gardner ............... | G05D 1/0016 463/40 |
| 2011/0166703 | A1* | 7/2011 | Byrne .................... | B25J 9/1682 901/50 |
| 2013/0090760 | A1* | 4/2013 | Jung ...................... | B25J 9/1674 700/245 |
| 2013/0282176 | A1* | 10/2013 | Lapham .................. | B25J 9/161 700/259 |

FOREIGN PATENT DOCUMENTS

JP          10-161945        6/1998

* cited by examiner

*Primary Examiner* — Christopher E. Everett
(74) *Attorney, Agent, or Firm* — Wenderoth, Lind & Ponack, L.L.P.

(57) ABSTRACT

Operation of an NC device can be restricted during the time until processing requested by a transmitting side is completed by a receiving side. An information processing device communicatively connected to a controller of an industrial machine including a processing request transmission unit that transmits a processing request to the controller; a processing completion notification management unit that detects a processing completion notification, transmitted from the controller, which notifies of completion of processing according to the processing request; and an operation restriction control unit that restricts processing request operation of the controller for a next operation until the processing completion notification is detected by the processing completion notification management unit.

10 Claims, 7 Drawing Sheets

COMMUNICATION CONTROLLER

This application is based on and claims the benefit of priority from Japanese Patent Application No. 2019-221525, filed on 6 Dec. 2019, the content of which is incorporated herein by reference.

BACKGROUND OF THE INVENTION

Field of the Invention

The present invention relates to a communication controller.

Related Art

By connecting an information processing device such as a computer device to a numerical controller via a network, the information processing device can output to the numerical controller a request to display data of the numerical controller, to change the settings of a machine tool controlled by the numerical controller, start automatic operation or remote diagnosis of the machine tool, and the like. In response, the numerical controller transmits replies to the requests to the information processing device.

FIG. 7 is a diagram illustrating an example of a numerical control system 5 in which an information processing device 52 functioning as a client is provided with a CNC (Computer Numerical Controller) display application functioning as a Web application and a numerical controller 51 (hereinafter, also referred to as "NC device 51") is provided with a Web server functioning as a server. Specifically, the numerical control system 5 is provided with the NC device 51, the client 52, and a machine tool 53.

The machine tool 53 includes a spindle and a plurality of drive shafts, and rotation thereof moves a driven body. The machine tool 53 is not particularly limited, and a typical example of the machine tool 53 includes a machining center.

The NC device 51 controls the spindle and the drive shafts of the machine tool 53 in accordance with a machining program. The NC device 51, for example, can be realized by an appropriate control program being executed by a computer device including a CPU (Computer Processing Unit), memory, an I/O (Input/Output) interface, and the like.

The NC device 51 is provided with a server (Web server) 511, an NC processing unit 512, and an NC data unit 513.

In the NC device 51, the NC processing unit 512 creates/updates or references various data stored in the NC data unit 513 based on a machining command or the like as necessary and controls the spindle and the drive shafts of the machine tool 53 and stores values relating thereto, various attribute values relating to the machine tool 53, and the like in the NC data unit 513.

Also, in response to a request from the information processing device (client) 52, the result of the processing by the NC processing unit 512 is output to the server 511 and the server 511 transmits this to the information processing device (client) 52 functioning as a display unit, i.e., a display or a tablet, and, for example, requests the information processing device (client) 52 to display the processing result.

In the related art, communication of data between the server 511 and the information processing device (client) 52 is executed via a wired or wireless network and is realized using the Internet (registered trademark), for example.

However, the transmission of data between the server 511 and the information processing device (client) 52 can fail due to the effects of noise and the like. For example, in the case in which the information processing device (client) 52 fails to transmit to the server 511 data relating to settings, such as tool offset values, workpiece coordinate values, custom macro variable numbers, and the like and this data cannot be set in the NC device 51, when the next processing request is transmitted from the information processing device (client) 52 to the server 511 while in this state and the NC device 51 is operated, interference and the like may occur and an unexpected accident may occur.

Designed with this in mind, a known technology relating to communication between a client and a server (for example, see Japanese Unexamined Patent Application, Publication No. H10-161945) includes a communication state monitoring unit that monitors the communication state between a server and a client on the server side, for example, the technology being configured to discard data transmissions when a communication interruption occurs and retransmit data when the communication state is restored.

Patent Document 1: Japanese Unexamined Patent Application, Publication No. H10-161945

SUMMARY OF THE INVENTION

Take an example in which an NC device has a configuration of the technology of Japanese Unexamined Patent Application, Publication No. H10-161945. In this example, during the time until the NC device, a receiving side, completes a processing requested by a client, a transmitting side, if the next processing request is transmitted from the client to a server before data is retransmitted and the NC device is operated, an accident involving interference of the tool may occur.

Also, in the reverse case, during the time until the client, the receiving side, completes the processing requested by the NC device, the transmitting side, if the next processing request is transmitted from the client and the NC device is operated, an accident involving interference of the tool may occur.

Thus, in the numerical control system 5 described above, a predetermined operation of the transmitting side is desirably restricted during the time until the receiving side completes the processing requested by the transmitting side.

An aspect of the present disclosure is an information processing device communicatively connected to a controller of an industrial machine including:
a processing request transmission unit that transmits a processing request to the controller;
a processing completion notification management unit that detects a processing completion notification, transmitted from the controller, which notifies of completion of processing according to the processing request; and
an operation restriction control unit that restricts processing request operation of the controller for a next operation until the processing completion notification is detected by the processing completion notification management unit.

According to an aspect, operation of the NC device can be restricted during the time until processing requested by the transmitting side is completed by the receiving side.

DETAILED DESCRIPTION OF THE INVENTION

1. First Embodiment

A first embodiment of the present invention will be described below with reference to FIGS. 1 and 2.

Figure 1:
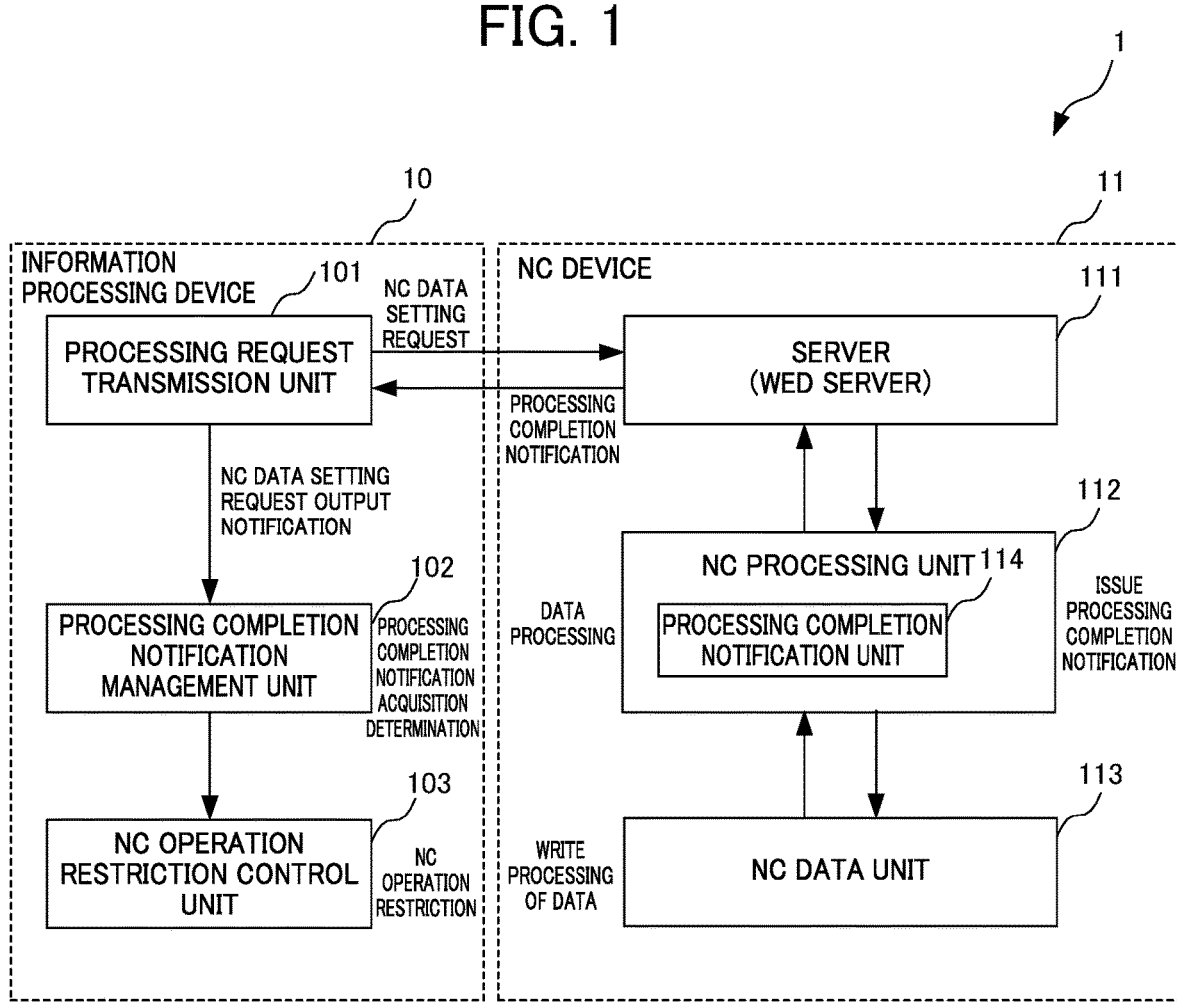
FIG. 1 is a functional block diagram according to a control system of an embodiment.
Figure 2:
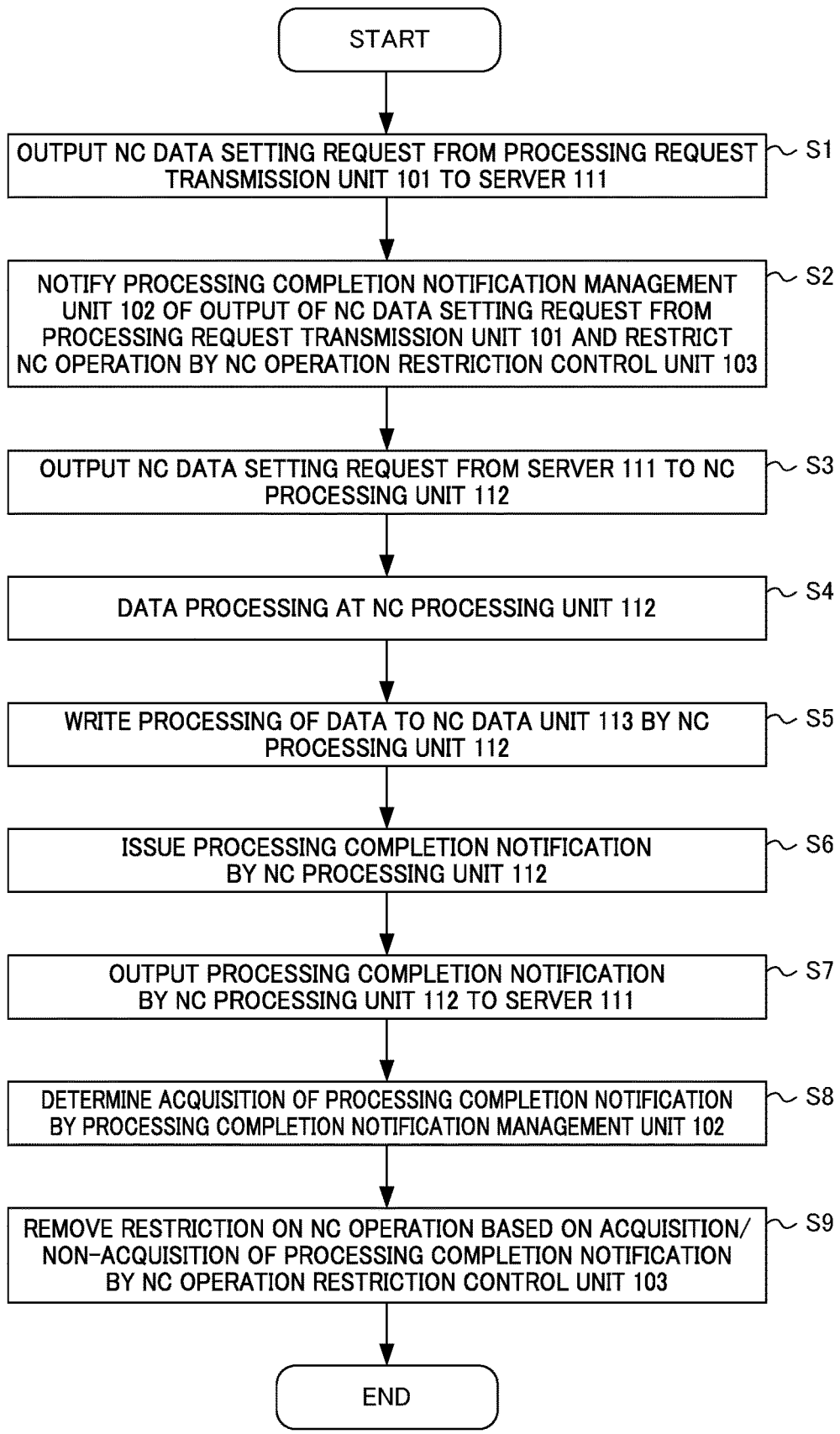
FIG. 2 is a flowchart illustrating an operation of a control system of an embodiment.

FIG. 1 is a functional block diagram of a control system 1 according to the first embodiment. FIG. 2 is a flowchart illustrating an operation of the control system 1 according to the first embodiment.

As illustrated in FIG. 1, the control system 1 is provided with an information processing device 10 and an NC device 11.

The information processing device 10 is a device that outputs to the NC device 11 a request, such as an output request for various control data the NC device 11 includes, various state data, and the like or a request to change the settings of a machine tool controlled by the NC device 11 and start automatic operation or remote diagnosis of the machine tool.

The information processing device 10 is provided with a processing request transmission unit 101, a processing completion notification management unit 102, and a NC operation restriction control unit 103.

The processing request transmission unit 101 transmits a processing request to the NC device 11. Examples of a processing request include, as described above, requests such as an output request for various control data the NC device 11 includes, various state data, and the like or requests to change the settings of a machine tool controlled by the NC device 11 and start automatic operation or remote diagnosis of the machine tool.

The processing completion notification management unit 102 detects that a processing completion notification which notifies of the completion of processing according to a processing request transmitted from the NC device 11 has been received. Specifically, the processing completion notification management unit 102 manages the reception/non-reception of a processing completion notification which is a notification sent from the NC device 11 to the information processing device 10 notifying of the completion by the information processing device 10 side of processing requested by the NC device 11.

The NC operation restriction control unit 103 restricts processing request operations of the NC device 11 for the next operation until the processing completion notification management unit 102 detects a processing completion notification. For example, the NC operation restriction control unit 103 prohibits machining execution by the NC device 11, prohibits measurement of workpiece coordinate value, i.e., values of the coordinates where the workpiece is placed on the machine tool controlled by the NC device 11, prohibits measurement of an offset value of a tool install on the machine tool, and the like.

The NC device 11 is provided with a server 111, an NC processing unit 112, and an NC data unit 113. Note that the server 111 shares the same functions as the server 511 illustrated in FIG. 7 and the NC data unit 113 shares the same functions as the NC data unit 513 illustrated in FIG. 7. Thus, the descriptions thereof are omitted here.

Figure 7:
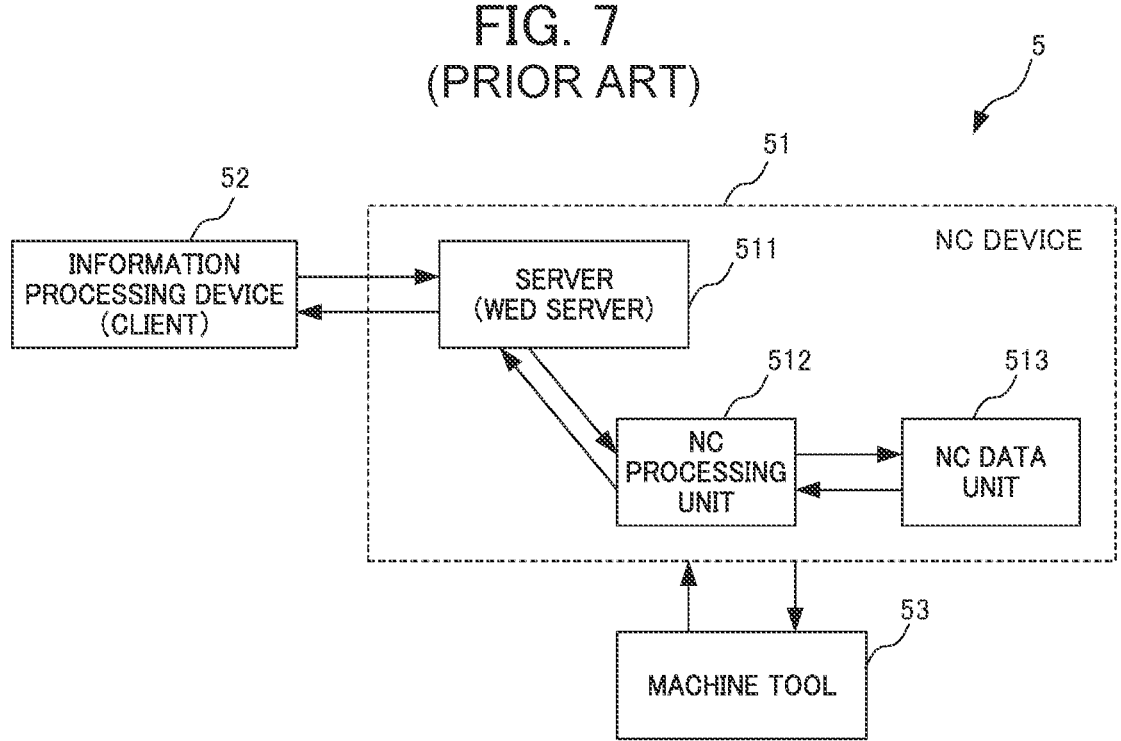
FIG. 7 is a diagram illustrating a CNC display application configuration according to known technology.

The NC processing unit 112, as with the NC processing unit 512 illustrated in FIG. 7, creates/updates or references various data stored in the NC data unit 113 and controls a spindle and drive shafts of a machine tool and stores values relating thereto, various attribute values relating to a machine tool, and the like in the NC data unit 513.

Furthermore, the NC processing unit 112 is provided with a processing completion notification unit 114. The processing completion notification unit 114 issues a processing completion notification which notifies of the completion of processing of various data stored in the NC data unit 113.

The operation of the control system 1 will be described below with reference to the flowchart in FIG. 2. Note that the flowchart in FIG. 2 illustrates an example in which an NC data setting request is output from the information processing device 10 to the NC device 11. However, the present embodiment is not limited thereto.

In Step S1, an NC data setting request is output from the processing request transmission unit 101 to the server 111. Note that examples of the specific contents of the NC data setting request include settings for various tool data, i.e., tool type, such as drill, milling, and the like and tool dimensions, such as tool length, tool diameter, and the like; settings for workpiece coordinate values, which are coordinates of where the workpiece is placed in the machine tool; settings for a machining program selected for editing, machining execution to be performed by the NC device 11; settings for custom macro variable number values referenced from the machining program; and the like.

In Step S2, a notification of the output of the NC data setting request is sent from the processing request transmission unit 101 to the processing completion notification management unit 102. Then, the NC operation restriction control unit 103 restricts NC operations. Specifically, the next operation request is restricted from being output from the information processing device 10 to the NC device 11. (For example, processing such as stopping transmissions from the processing request transmission unit 101 may be executed).

In Step S3, an NC data setting request is output from the server 111 to the NC processing unit 112.

In Step S4, data processing is executed at the NC processing unit 112.

In Step S5, the NC processing unit 112 executes write processing of data to the NC data unit 113.

In Step S6, the NC processing unit 112 issues a processing completion notification.

In Step S7, the NC processing unit 112 outputs the processing completion notification to the server 111.

In Step S8, the processing completion notification management unit 102 determines that a processing completion notification has been acquired from the server 111.

In Step S9, the NC operation restriction control unit 103 determines that a processing completion notification has been acquired via the processing completion notification management unit 102 in Step S8 and removes the restrictions on NC operations. Specifically, the next operation request is enabled to be output from the information processing device 10 to the NC device 11.

(For example, transmissions from the processing request transmission unit 101 are made possible).

2. Second Embodiment

Figure 3:
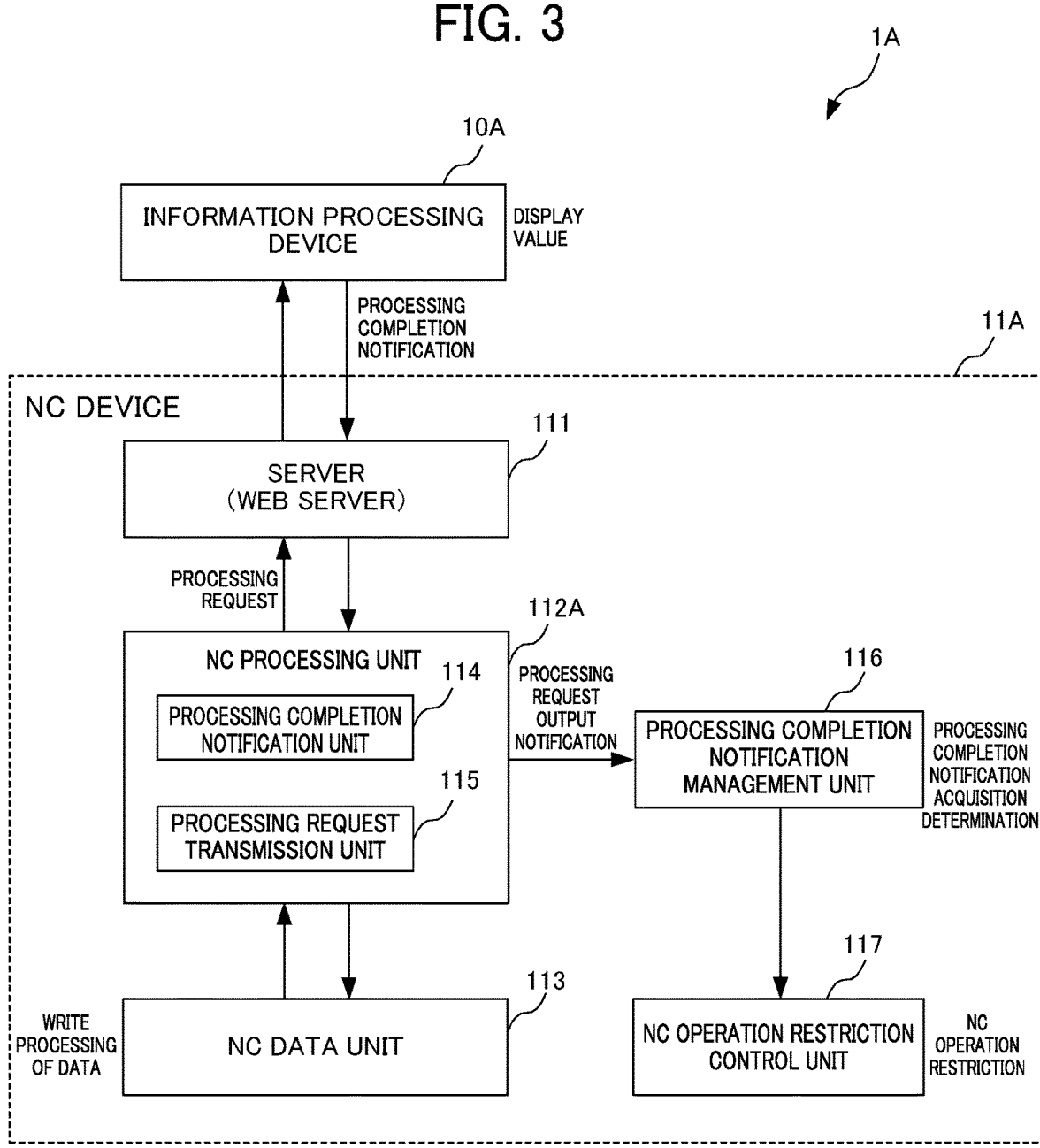
FIG. 3 is a functional block diagram according to a control system of an embodiment.
Figure 4:
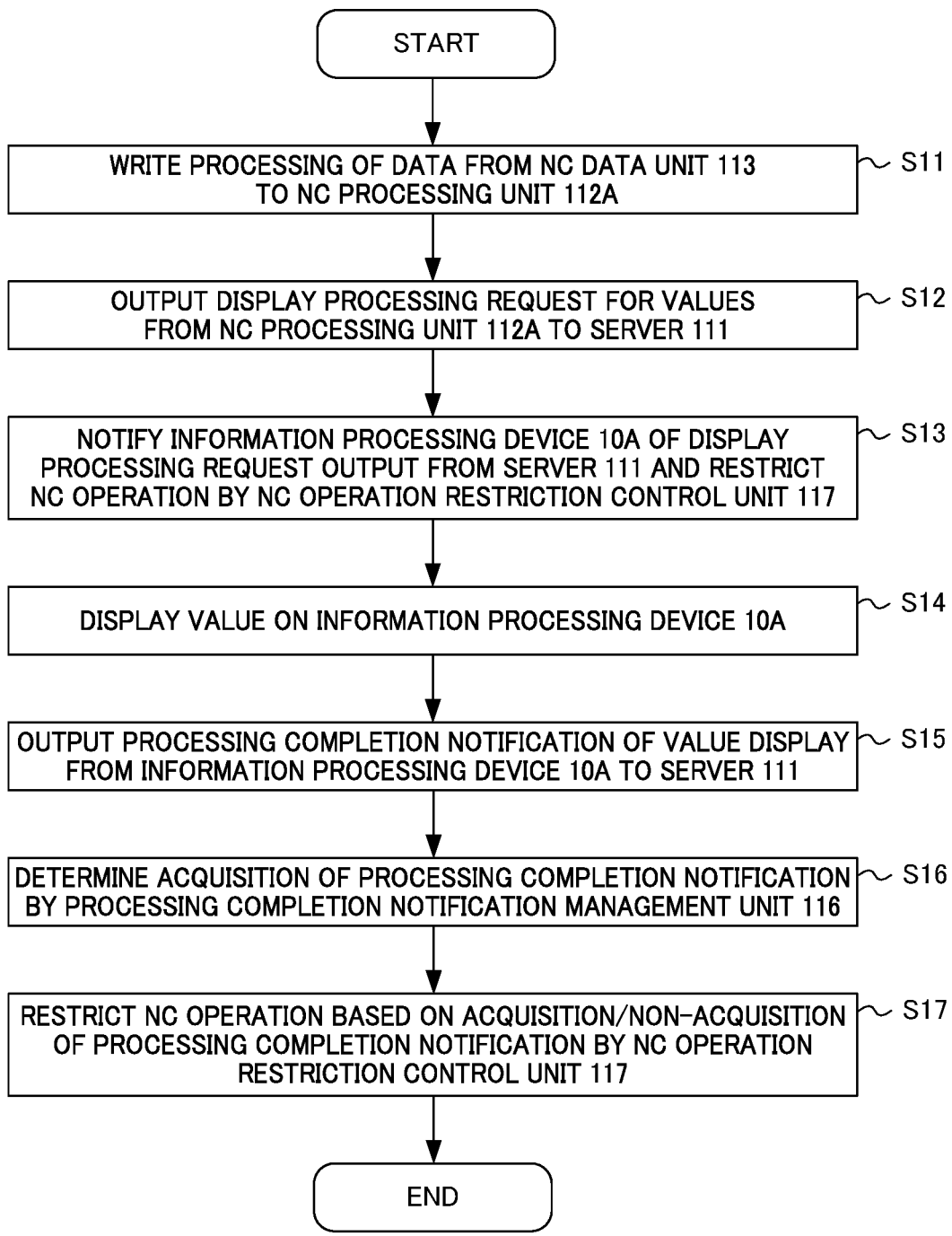
FIG. 4 is a flowchart illustrating an operation of a control system of an embodiment.

A second embodiment of the present invention will be described below with reference to FIGS. 3 and 4. FIG. 3 is a functional block diagram of a control system 1A according to the second embodiment. FIG. 4 is a flowchart illustrating an operation of the control system 1A according to the second embodiment.

As illustrated in FIG. 3, the control system 1A is provided with an information processing device 10A and an NC device 11A.

In the control system 1A, the NC device 11A, as with the NC device 11, is provided with the server 111 and the NC data unit 113. The NC device 11A is also provided with an NC processing unit 112A instead of the NC processing unit 112. Also, the NC processing unit 112A is provided with the processing completion notification unit 114 as well as a processing request transmission unit 115. Furthermore, the NC device 11A is provided with a processing completion notification management unit 116 and a NC operation restriction control unit 117.

In this embodiment, the processing request transmission unit 115 transmits a processing request to the information processing device 10A via the server 111. An example of a processing request includes a display processing request for values, the values being obtained by the workpiece coordinate values or the tool offset values being automatically measured by an MDI program, then the measured values being output from the NC device 11 to the information processing device 10A.

The processing completion notification management unit 116 detects that a processing completion notification which notifies of the completion of processing according to a processing request transmitted from the information processing device 10A has been received. Specifically, the processing completion notification management unit 116 manages the reception/non-reception of a processing completion notification which is a notification sent from the information processing device 10A to the NC device 11A notifying of the completion by the NC device 11A side of processing requested by the information processing device 10A.

The NC operation restriction control unit 117 restricts processing request operations of the NC device 11A for the next operation until the processing completion notification management unit 116 detects a processing completion notification. For example, the NC operation restriction control unit 117 prohibits machining execution by the NC device 11A, prohibits measurement of workpiece coordinate value, i.e., values of the coordinates where the workpiece is placed on the machine tool controlled by the NC device 11A, prohibits measurement of an offset value of a tool install on the machine tool, and the like.

The operation of the control system 1A will be described below with reference to the flowchart in FIG. 4. Note that the flowchart in FIG. 4 illustrates an example in which a display processing request for values, the values being obtained by the workpiece coordinate values or the tool offset values being automatically measured by an MDI program, then the measured values being output from the NC device 11 to the information processing device 10. However, the present embodiment is not limited thereto.

In Step S11, write processing of data from the NC data unit 113 to the NC processing unit 112A is executed. Specifically, in the NC processing unit 112A, for example, by executing an MDI program for measuring the workpiece coordinate values or the tool offset values, the workpiece coordinate values or the tool offset values are automatically measured. The write processing of these workpiece coordinate values or tool offset values from the NC data unit 113 to the NC processing unit 112A is executed.

In Step S12, a display processing request for measured workpiece coordinate values or tool offset values is output from the processing request transmission unit 115 of the NC processing unit 112A to the server 111.

In Step S13, notification of a display processing request output is sent from the server 111 to the information processing device 10A. Then, the NC operation restriction control unit 117 restricts NC operations.

In Step S14, the workpiece coordinate values or the tool offset values are displayed at the information processing device 10A.

In Step S15, a processing completion notification for displaying the workpiece coordinate values or the tool offset values is output from the information processing device 10A to the server 111.

In Step S16, the processing completion notification management unit 116 determines that a processing completion notification has been acquired.

In Step S17, the NC operation restriction control unit 117 determines that a processing completion notification has been acquired via the processing completion notification management unit 116 in Step S16 and removes the restrictions on NC operations.

3. Third Embodiment

Figure 5:
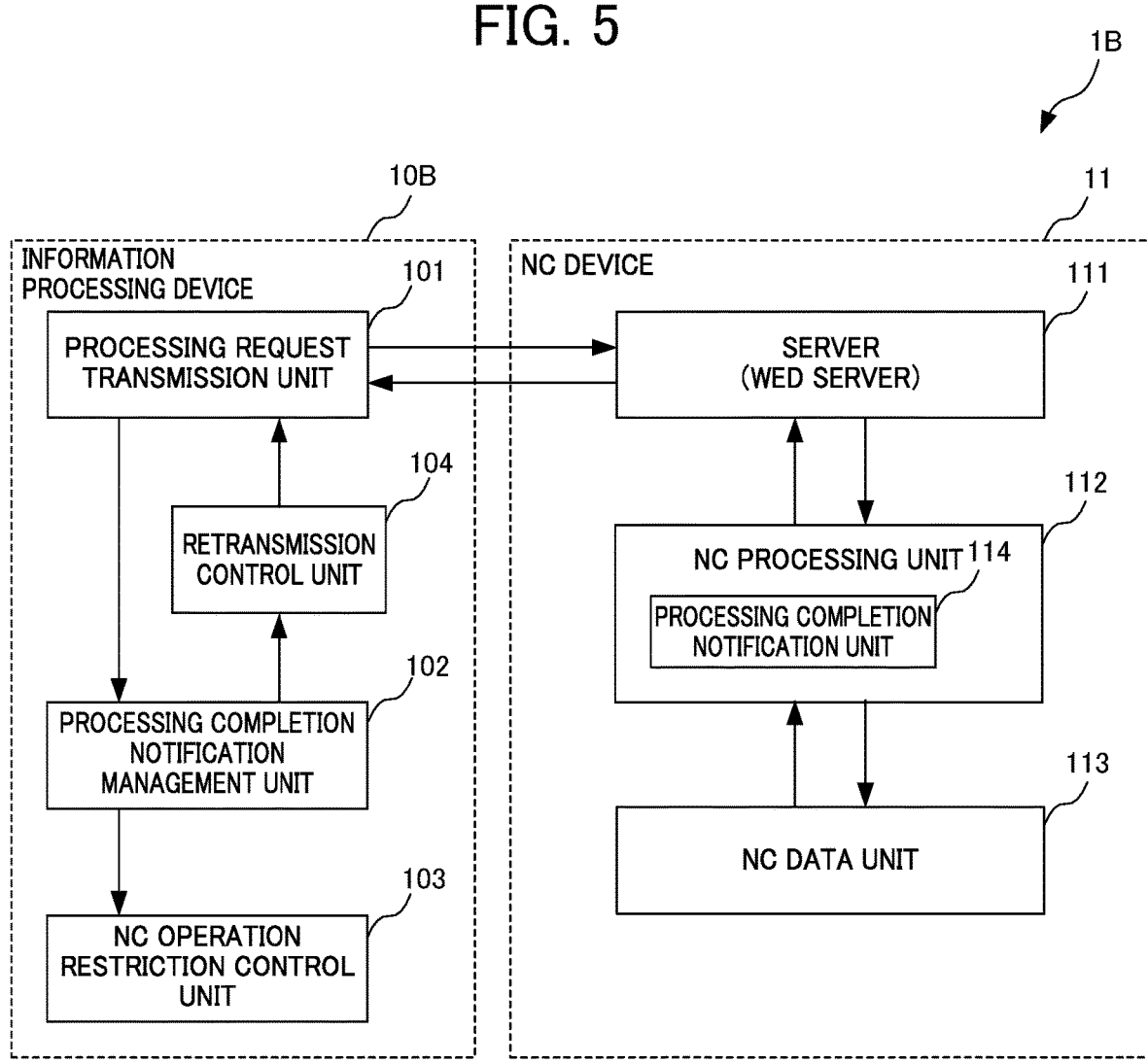
FIG. 5 is a functional block diagram according to a control system of an embodiment.

A third embodiment of the present invention will be described below with reference to FIG. 5. FIG. 5 is a functional block diagram of a control system 1B according to the third embodiment.

The control system 1B is provided with an information processing device 10B instead of the information processing device 10 provided in the control system 1.

The information processing device 10B is provided with the components provided in the information processing device 10 as well as a retransmission control unit 104. In the present embodiment, the retransmission control unit 104 at the information processing device 10B side retransmits a processing request to the NC device 11 side in the case in which the processing completion notification management unit 102 does not detect a processing completion notification within a predetermined amount of time. Note that the predetermined amount of time and the number of retransmissions may be set in advance in the information processing device 10B (for example, the processing completion notification management unit 102).

4. Fourth Embodiment

Figure 6:
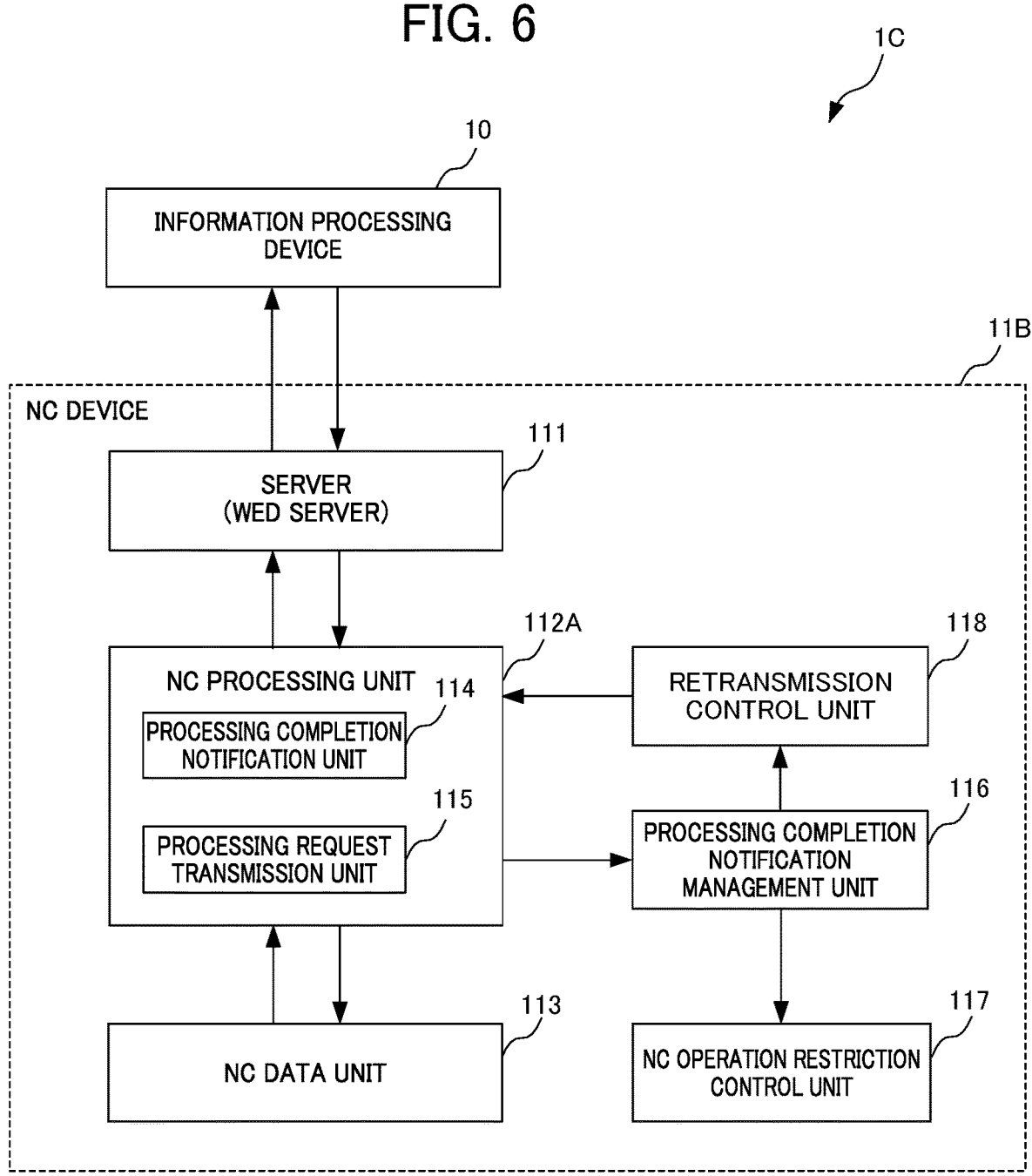
FIG. 6 is a functional block diagram according to a control system of an embodiment.

A fourth embodiment of the present invention will be described below with reference to FIG. 6. FIG. 6 is a functional block diagram of a control system 1C according to the fourth embodiment.

The control system 1C is provided with an NC device 11B instead of the NC device 11 provided in the control system 1A.

In the present embodiment, a retransmission control unit 118 retransmits a processing request to the information processing device 10 in the case in which the processing completion notification management unit 116 does not detect a processing completion notification within a predetermined amount of time. Note that the predetermined amount of time and the number of retransmissions may be set in advance in the NC device 11B (for example, the processing completion notification management unit 116).

5. Modification Example

The embodiments described above are modes with the premise that the NC device 11 or 11A controls a machine tool. However, no such limitation is intended, and the controller may be a robot controller that controls a robot.

In this case, examples of the NC data setting request output from the information processing device to the robot controller include restriction value settings for the safety speed of the robot, i.e., settings for the maximum speed when the robot is operating, and restriction settings for a safety position of the robot, i.e., settings for the area in which the robot can move when operating.

Also, an example of the display processing request output from the robot controller to the information processing device is a display processing request for sending a display request to the information processing device side, after a robot is caused to execute a program for causing a preset predetermined operation, for positional coordinate values of an arm or the like of the robot after the operation is completed.

Note that the coordinate values while the robot is in operation are constantly being updated. Thus, even in the case of the display request failing, the operation of the robot does not need to be restricted. However, incorrect values for the coordinate values after the robot has completed a series of operations may cause an accident when the next instruction is sent to the robot. This makes it necessary to restrict the operation of the robot.

(1) An information processing device according to the present invention is an information processing device (for example, the information processing device 10 described above) communicatively connected to a controller (for example, the NC device 11 described above) of an industrial machine, including:
a processing request transmission unit (for example, the processing request transmission unit 101 described above) that transmits a processing request to the controller;
a processing completion notification management unit (for example, the processing completion notification management unit 102 described above) that detects a processing completion notification, transmitted from the controller, which notifies of completion of processing according to the processing request; and
an operation restriction control unit (for example, the NC operation restriction control unit 103 described above) that restricts processing request operation of the controller for a next operation until the processing completion notification is detected by the processing completion notification management unit.

According to this configuration, by restricting NC operation until the processing completion notification is received, accidents involving tool interference can be prevented.

(2) The information processing device according to (1), wherein
the operation restriction control unit may restrict processing request operation of the controller for a next operation until the processing completion notification is detected in a case in which processing according to a processing request transmitted by the processing request transmission unit to the controller is a predetermined processing.

According to this configuration, the communication controller can restrict operation of the controller only in the case in which specific processing is executed.

(3) The information processing device according to (2) may further include
a retransmission control unit that retransmits the processing request to the controller in a case in which the processing completion notification is not detected by the processing completion notification management unit within a predetermined amount of time.

According to this configuration, in the case in which the processing completion notification is not received and communication between the client and the server has likely failed, by retransmitting the processing request, processing coming to a stop can be avoided.

(4) The information processing device according to (2) or (3), wherein
the industrial machine may be a machine tool;
the controller may be a numerical controller; and
the predetermined processing may include one or more of: tool data settings, workpiece coordinate value settings, machining program settings, or custom macro variable number value settings.

According to this configuration, in the case in which the machine tool is controlled by the numerical controller, the server side processes the processing requested by the client side and, during the time until the processing completion notification is received by the client side, operation of the numerical controller can be restricted.

(5) The information processing device according to (2) or (3), wherein
the industrial machine may be a robot;
the controller may be a robot controller; and
the predetermined processing may include one or more of: restriction value settings for a safety speed of the robot or restriction settings for a safety position of the robot.

According to this configuration, in the case in which the robot is controlled by the controller, the server side processes the processing requested by the client side and, during the time until the processing completion notification is received by the client side, operation of the numerical controller can be restricted.

(6) A controller (for example, the NC device 11A described above) according to the present invention is a controller of an industrial machine communicatively connected to an information processing device (for example, the information processing device 10A described above), including: a processing request transmission unit (for example, the processing request transmission unit 115 described above) that transmits a processing request to the information processing device;
a processing completion notification management unit (for example, the processing completion notification management unit 116 described above) that detects a processing completion notification, transmitted from the information processing device, which notifies of completion of processing according to the processing request; and
an operation restriction control unit (for example, the NC operation restriction control unit 117 described above) that restricts a next operation of the controller until the processing completion notification is detected by the processing completion notification management unit.

According to this configuration, by restricting NC operation until the processing completion notification is received, accidents involving tool interference can be prevented.

(7) The information processing device according to (6), wherein
the operation restriction control unit may restrict processing request operation of the controller for a next operation until the processing completion notification is detected in a case in which processing according to a processing request transmitted by the processing request transmission unit to the controller is a predetermined processing.

According to this configuration, the communication controller can restrict operation of the controller only in the case in which specific processing is executed.

(8) The controller according to (7) may further include a retransmission control unit (for example, the retransmission control unit 118 described above) that retransmits the processing request to the information processing device in a case in which the processing completion notification is not detected by the processing completion notification management unit within a predetermined amount of time.

According to this configuration, in the case in which the processing completion notification is not received and communication between the client and the server has likely failed, by retransmitting the processing request, processing coming to a stop can be avoided.

(9) The controller according to (7) or (8), wherein
the industrial machine may be a machine tool;
the controller may be a numerical controller; and
the predetermined processing may include one or more of:
an output request for a tool offset value or an output request for a workpiece coordinate value.

According to this configuration, in the case in which the machine tool is controlled by the numerical controller, the client side processes the processing requested by the server side and, during the time until the processing completion notification is received by the server side, operation of the numerical controller can be restricted.

(10) The controller according to (7) or (8), wherein
the industrial machine may be a robot;
the controller may be a robot controller; and
the predetermined processing may include an output request for a positional coordinate value relating to the robot after operation completion.

According to this configuration, in the case in which the robot is controlled by the controller, the client side processes the processing requested by the server side and, during the time until the processing completion notification is received by the server side, operation of the numerical controller can be restricted.

Embodiments of the present invention have been described above. However, the present invention is not limited by the embodiments described above. Also, the effects listed for the present embodiments are simply the best effects gained from the present invention, and the effects of the present invention are not limited those listed for the present embodiments.

A method for controlling communication by the control systems 1 to 1C may be realized via software. In the case in which the method is realized via software, the program that constitutes the software is installed on a computer (the information processing device 10 or 10B and the NC devices 11 to 11B). Also, such programs may be distributed to users in the form of removable media or distributed in a manner allowing users to download the program via a network onto a computer. Furthermore, such programs may be provided to a computer (the information processing device 10 or 10B and the NC devices 11 to 11B) of a user as a Web service via a network without requiring downloading.

EXPLANATION OF REFERENCE NUMERALS

1, 1A, 1B, 1C Control system
5 Numerical control system
10, 10A, 10B, 52 Information processing device (client)
11, 11A, 11B, 51 NC device (numerical controller)
53 Machine tool
101, 115 Processing request transmission unit
102, 116 Processing completion notification management unit
103, 117 NC operation restriction control unit
104, 118 Retransmission control unit
111, 511 Server (Web server)
112, 512 NC processing unit
113, 513 NC data unit
114 Processing completion notification unit

What is claimed is:

1. An information processing device communicatively connected to a controller of an industrial machine, comprising:
   a processing request transmission unit that transmits a processing request to the controller to make the controller to process a requested operation, wherein the requested operation modifies a setting or an operation of the industrial machine;
   a processing completion notification management unit that manages the reception/non-reception of a processing completion notification, transmitted from the controller, which is a receiving side of the processing request from the information processing device and notifies of completion of processing of the setting or operation of the industrial machine according to the processing request;
   an operation restriction control unit that restricts processing request to make the controller to process a next operation of the controller from the transmission of the processing request to the controller until the processing completion notification management unit detects reception of the processing completion notification from the controller that is the receiving side of the processing request.

2. The information processing device according to claim 1, wherein
   the operation restriction control unit restricts processing request operation of the controller for a next operation until the processing completion notification is detected in a case in which processing according to a processing request transmitted by the processing request transmission unit to the controller is a predetermined processing.

3. The information processing device according to claim 2, further comprising
   a retransmission control unit that retransmits the processing request to the controller in a case in which the processing completion notification is not detected by the processing completion notification management unit within a predetermined amount of time.

4. The information processing device according to claim 2, wherein the industrial machine is a machine tool;
   the controller is a numerical controller; and
   the predetermined processing includes one or more of:
   tool data settings, workpiece coordinate value settings, machining program settings, or custom macro variable number value settings.

5. The information processing device according to claim 2, wherein the industrial machine is a robot;
   the controller is a robot controller; and
   the predetermined processing includes one or more of:
   restriction value settings for a safety speed of the robot or restriction settings for a safety position of the robot.

6. A controller of an industrial machine communicatively connected to an information processing device, comprising:

a processing request transmission unit that transmits a processing request to the information processing device to make the information processing device to process the requested operation, wherein the requested operation displays data values related to the operation of the industrial machine;

a processing completion notification management unit that manages the reception/non-reception of a processing completion notification, transmitted from the information processing device, which is a receiving side of the processing request from the controller and notifies of completion of processing of the displaying the data values related to the operation of the industrial machine according to the processing request; and an operation restriction control unit that restricts a next operation of the controller until the processing completion notification management unit detects reception of the processing completion notification from the information processing device that is the receiving side of the processing request.

7. The controller according to claim 6, wherein the operation restriction control unit restricts a next operation of the controller until the processing completion notification is detected in a case in which processing according to a processing request transmitted by the processing request transmission unit to the information processing device is a predetermined processing.

8. The controller according to claim 7, further comprising a retransmission control unit that retransmits the processing request to the information processing device in a case in which the processing completion notification is not detected by the processing completion notification management unit within a predetermined amount of time.

9. The controller according to claim 7, wherein the industrial machine is a machine tool;

the controller is a numerical controller; and the predetermined processing includes one or more of:

an output request for a tool offset value or an output request for a workpiece coordinate value.

10. The controller according to claim 7, wherein the industrial machine is a robot;

the controller is a robot controller; and the predetermined processing includes an output request for a positional coordinate value relating to the robot after operation completion.

* * * * *